(12) United States Patent
Matsumoto

(10) Patent No.: US 6,649,226 B2
(45) Date of Patent: Nov. 18, 2003

(54) LIQUID CRYSTAL MATERIAL AND LIQUID CRYSTAL DISPLAY

(75) Inventor: Kimikazu Matsumoto, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 200 days.

(21) Appl. No.: 09/877,180

(22) Filed: Jun. 11, 2001

(65) Prior Publication Data

US 2002/0028305 A1 Mar. 7, 2002

(30) Foreign Application Priority Data

Jun. 14, 2000 (JP) ........................................ 2000-178667
Mar. 23, 2001 (JP) ........................................ 2001-085793

(51) Int. Cl.$^7$ ...................... C09K 19/54; C09K 19/58; G02F 1/13
(52) U.S. Cl. .................. 428/1.1; 252/299.2; 252/299.5
(58) Field of Search ........................ 428/1.1; 252/299.2, 252/299.5

(56) References Cited

U.S. PATENT DOCUMENTS

| | | | | | |
|---|---|---|---|---|---|
| 4,180,475 | A | * | 12/1979 | Schadt et al. | ............ 252/299.5 |
| 5,723,065 | A | * | 3/1998 | Inaba et al. | ............ 252/299.01 |
| 6,139,925 | A | * | 10/2000 | Darius et al. | ................ 428/1.1 |
| 6,172,720 | B1 | * | 1/2001 | Khan et al. | .................... 349/35 |

FOREIGN PATENT DOCUMENTS

| | | |
|---|---|---|
| JP | 63-21907 | 5/1988 |
| JP | 7-306417 | 11/1995 |

* cited by examiner

Primary Examiner—Shean C. Wu
(74) Attorney, Agent, or Firm—McGinn & Gibb, PLLC

(57) ABSTRACT

A dissociating substance and its salt are added to a liquid crystal to keep the amount of ions included in the liquid crystal constant under temperature variation and to prevent alignment disorder in the liquid crystal due to static electricity and unevenness or spots due to excessive ion accumulation, leading to improved reliability.

20 Claims, 2 Drawing Sheets

LIQUID CRYSTAL MATERIAL AND LIQUID CRYSTAL DISPLAY

BACKGROUND OF THE INVENTION

1. Field of the Invention

This invention relates to a liquid crystal material and a liquid crystal display. In particular, it relates to a liquid crystal material which can stably realize low resistance condition of a liquid crystal.

2. Description of the Prior Art

A display panel in an in-plane-switching (IPS) type of liquid crystal display where a liquid crystal is sandwiched between a pair of transparent substrates in a given distance has a feature that it can achieve a wider viewing angle than that in a display panel in a twist-nematic (TN) type of liquid crystal display where an electric field substantially vertical to a substrate surface is applied to a liquid crystal. It is because in the IPS type of liquid crystal display an electric field applied to the liquid crystal is substantially parallel to the substrates and thus the electric field rotates the liquid crystal molecules toward an in-substrate-plane and a horizontal directions.

An electric field substantially parallel to a substrate may be generated by disposing a pixel electrode and a common electrode, both of which are formed in a fashion of a comb-teeth form with a given space to each other on one of transparent substrates sandwiching a liquid crystal. An LCD utilizing such a lateral electric field has been proposed in, for example, Japanese Patent Publication No. 63-21907. Whereas a liquid crystal panel using the IPS system may achieve a very wide viewing angle, it has a problem that alignment disorder is apt to occur due to static electricity compared with a liquid crystal panel using a TN system because an opposite color filter substrate (the substrate where color filter is formed) opposing to a TFT substrate (the substrate where TFT is formed) does not have an ITO electrode.

A technique for preventing such an alignment disorder in an IPS type of liquid crystal display has been disclosed in, for example, Japanese Patent Laid-Open No. 7-306417, which is hereinafter referred to as "conventional example 1".

Conventional example 1 has described that alignment disorder due to static electricity may occur easier because a liquid-crystal capacitance in the IPS system is smaller than that in the TN system. Specifically, when static electricity generates in a liquid crystal for some reason, the smaller the liquid crystal capacitance is, the larger an accumulated-charge difference of static electricity is between pixels with and without application of an electric field, leading to a larger luminance difference between them.

A smaller liquid crystal capacitance in the IPS system than the TN system is due to their different electric-field modes. Specifically, in the TN system an electric field is applied vertically to the substrates so that a liquid crystal between the upper and the lower substrates plays a role of capacitance, while in the IPS system an electric field is applied to a liquid crystal with a substrate in parallel with a relatively small distance near the surface of the one of the substrates so that the volume of liquid crystal to which the electric field is applied is less than that in the TN system, leading to a smaller liquid crystal capacitance in comparison with the TN system. For example, for a pixel size 300 $\mu$m×100 $\mu$m, it is 220 fF in the TN system while 100 fF in the IPS system.

Thus, there has been described that static electricity is prevented by reducing a specific resistance of a liquid crystal. There has been also described a technique that for achieving reduction in a specific resistance of a liquid crystal, the liquid crystal comprises a liquid crystal compound represented by formula (3) having at least one cyano, trifluoromethyl, trifluoromethoxy or nitro group as its end group:

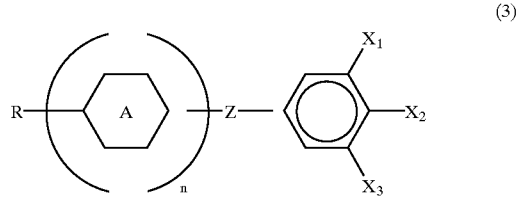

(3)

In formula (3) $X_1$ to $X_3$ represent fluoro, cyano, trifluoromethyl, trifluoromethoxy, nitro or hydrogen; R is optionally substituted alkyl or alkoxy having 1 to 10 carbon atoms; the ring A represents a cyclohexane, benzene, dioxane, pyrimidine or [2,2,2]-bicyclooctane ring; Z is a single bond, an ester linkage, an ether linkage, methylene, or ethylene; and n is an integer of 1 or 2.

The liquid crystal compound may have a molecular structure represented by formula (4) in which at least one cyano, trifluoromethyl, trifluoromethoxy or nitro group is introduced along the shorter molecular axis:

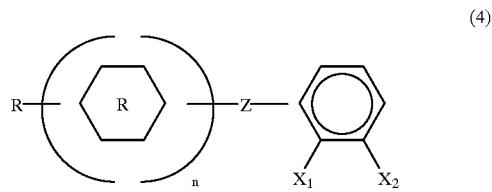

(4)

In formula (4) $X_1$ to $X_2$ represent fluoro, cyano, trifluoromethyl, trifluoromethoxy, nitro or hydrogen; R is optionally substituted alkyl or alkoxy having 1 to 10 carbon atoms; the ring A represents a cyclohexane, benzene, dioxane, pyrimidine or [2,2,2]-bicyclooctane ring; Z is a single bond, an ester linkage, an ether linkage, methylene, methyleneoxy or ethylene; and n is an integer of 1 or 2.

In practice, a liquid crystal with a higher polarity does not always provide a specific resistance of $10^{13}$ $\Omega$cm or less. Specifically, even a cyano-containing liquid crystal material may give a specific resistance of $10^{13}$ $\Omega$cm or more, leading to alignment failure. Conventional example 2 (Japanese Patent Laid-Open No. 11-349948) has disclosed that a liquid crystal may advantageously comprise a dissociating substance represented by formula (5):

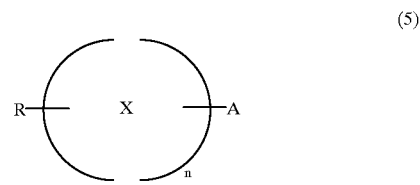

(5)

In formula (5) R represents hydrogen, alkyl or alkoxy; X represents a cyclohexane or benzene ring; A represents phenyl substituted by at least one phthalic anhydride moiety, —COOH, —CONH, —NH$_2$ and/or —OH; and n represents an integer of 1 or 2.

Conventional example 2 has described that the above problem can be solved by adding the dissociating substance in a liquid crystal. A dissociating substance as used herein refers to an acid- or base-dissociating substance, i.e., a substance spontaneously dissociating in a polar solvent to give H$^+$ ions or reacting with water to give OH$^-$ ions. It refers to, for example, a carboxylic acid including anhydride, amide, amine or alcohol. There has been described that such a substance may be added to a liquid crystal to increase an ion concentration in the liquid crystal and then reduce a specific resistance, resulting in the reduction of alignment failure due to static electricity.

The term "polarity" as used herein refers to a state where in atomic or molecular level, a liquid crystal structure has atoms, e.g., N, O and F or functional groups, e.g., —COOH and —OH different in an electronegativity or electron density from each other. The term "a higher polarity liquid crystal" refers to that an electron density is higher along a longer axis of the liquid crystal molecule because of a particular functional group. It is thus believed that a higher polarity liquid crystal molecule withdraws impurity ions in the liquid crystal by its higher polarity functional group to reduce a specific resistance of the liquid crystal (more ions).

The term "polar solvent" refers to a solvent having a higher polarity functional group and a higher polarity solvent can easily dissolve a higher polarity molecule, while a lower polarity solvent can easily dissolve a lower polarity molecule. Therefore, when dissolving a dissociating substance in a higher polarity solvent in a liquid crystal, the dissociating ions are of a higher polarity.

However, an actual specific resistance of a liquid crystal varies even after enclosing it in a liquid crystal panel due to long-term operation of the liquid crystal panel or external temperature variation. An actual specific resistance in the liquid crystal may, therefore, vary suffering from various stresses even when the specific resistance is about 10$^{13}$ Ωcm suitable for preventing alignment disorder due to static electricity immediately after enclosing the liquid crystal in the liquid panel. Specifically, when a specific resistance is increased, alignment disorder due to static electricity cannot be prevented while when it is excessively reduced, a voltage applied to the liquid crystal cannot be retained, leading to unevenness or spots in display.

After intense investigation, we have identified the causes for unevenness or spots and have found that a liquid crystal panel or liquid crystal material whose constitution will be described below may be used to prepare a highly reliable liquid panel.

There will be described a mechanism of variation in a specific resistance of a liquid crystal when adding a dissociating substance represented by formula (5), which in this case, has a carboxylic acid moiety.

A dissociating substance spontaneously dissociates in the liquid crystal to generate H$^+$ ions, which are thus responsible for a major part of charge in the liquid crystal.

Furthermore, in the liquid crystal, a part of the dissociating substance dissociates to give a dissociation equilibrium state represented by formula (6).

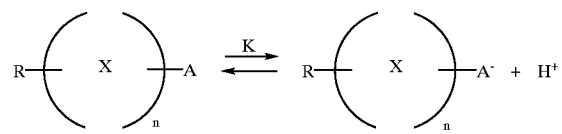

(6)

When a dissociating substance and its ion state after discharging an H$^+$ ion are designated as BH and B$^-$, respectively, a dissociation equilibrium constant K is given by formula (7)

$$K = \frac{[B^-][H^+]}{[BH]} \quad (7)$$

where an expression with parentheses [ ] represents a concentration.

An H$^+$ ion concentration [H$^+$] in the liquid crystal dominating a specific resistance of a liquid crystal can be given by formula (8).

$$[H^+] = \frac{K[BH]}{[B^-]} \quad (8)$$

On the other hand, a dissociation equilibrium constant K varies depending on the type of the dissociating substance and generally on a temperature. An H$^+$ ion concentration, i.e., a specific resistance of a liquid crystal, also varies depending on a temperature.

There is an alignment layer defining an initial orientation of a liquid crystal as an uppermost layer of two transparent insulating substrates sandwiching the liquid crystal. The alignment layer adsorbs charge, i.e., H+ ions in the liquid crystal, leading to a change of a liquid-crystal specific resistance in the liquid crystal panel plane.

SUMMARY OF THE INVENTION

An objective of this invention is to provide a liquid crystal material which has a lower specific resistance considerably independent of a temperature and can reliably prevent alignment disorder due to static resistance evenly in a liquid crystal panel plane, as well as a liquid crystal display comprising the liquid crystal material.

This invention provides a liquid crystal material comprising a liquid crystal and an additive therein which comprises a dissociating substance and a conjugate salt thereof.

This invention also provides a liquid crystal display comprising a liquid crystal and a pair of substrates sandwiching the liquid crystal and controlling an orientation of the liquid crystal by a lateral electric field generated on one of the substrates, wherein the liquid crystal comprises a dissociating substance and a conjugate salt thereof.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Before describing embodiments of this invention, a structure of a liquid crystal material on which this invention is based will be described.

The above-mentioned problems can be solved by following means.

Specifically, the above problems may be solved by adding a dissociating material and its salt in a liquid crystal with a certain proportion.

As an example, a substance represented by formula (5) having a carboxylic acid moiety will be described.

When a dissociating substance BH and its conjugate salt BC are added to a liquid crystal, these give the following dissociation equilibrium as represented in formula (9) and BC, the salt of the dissociating substance, completely dissociates.

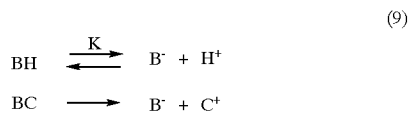

(9)

Thus, an $H^+$ ion concentration $[H^+]$ in the liquid crystal dominating a specific resistance of the liquid crystal can be represented by formula (10).

$$[H^+] = \frac{K[BH]}{[B^-]'} \tag{10}$$

$[B^-]'$ in formula (10) is a sum of $[B^-]$s in two equilibrium equations in formula (9). While K as a dissociation equilibrium constant is dependent on a temperature, the hydrogen ion concentration in formula (10) is substantially independent of a temperature because the denominator $[B^-]$ in formula (8) and the denominator $[B^-]'$ in formula (10) has a relationship: $[B^-]<<[B^-]'$. For example, when adding BH and BC with a ratio of 1:1 and BH and BC are 100, $[B^-]$ is about 0.5 and $[B^-]'$ is 100. That is, $[B^-]=0.5<<[B^-]'=100$ and there may be generally a difference of 2 to 4 orders.

A liquid crystal panel may be prepared as described above to provide a highly reliable liquid crystal display because of a consistently stable specific resistance of the liquid crystal.

Figure 1:
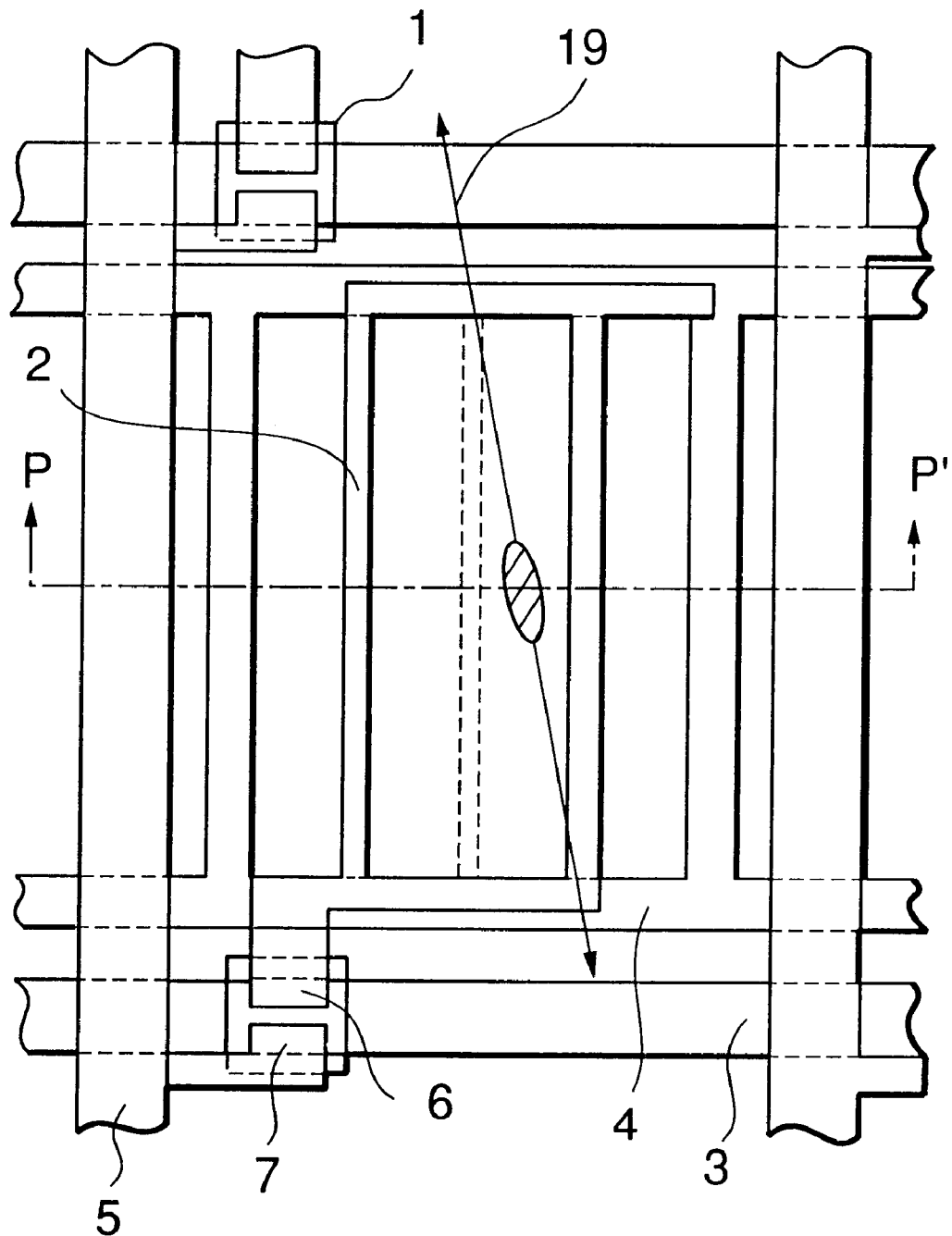
FIG. 1 is a schematic plan view of a TFT substrate in a liquid crystal display for illustrating an embodiment of this invention.
Figure 2:
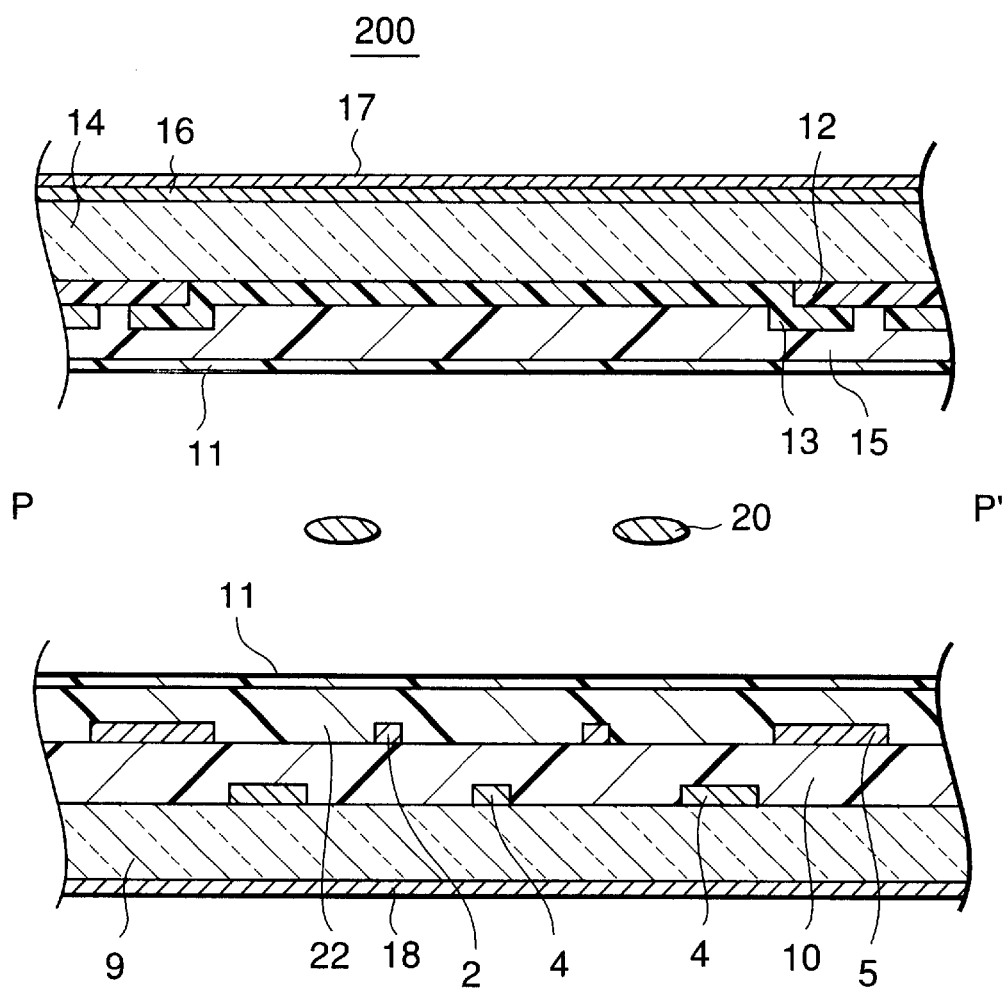
FIG. 2 is a schematic cross section of a liquid crystal display for illustrating an embodiment of this invention.

Next, there will be described Embodiment 1 of this invention with reference to FIGS. 1 and 2. FIG. 1 is a schematic plan view of a substrate on which a thin film transistor is formed (TFT substrate), from the side of the substrate opposing to the TFT substrate. FIG. 2 is a schematic cross section of a liquid crystal display taken on a plane perpendicular to the substrate and containing a cutting line P–P' in FIG. 1. A procedure for preparing the TFT substrate illustrated in FIG. 1 will be described with reference to FIG. 2.

On the first transparent substrate 9 made of, for example, glass, is patterned a Cr material to simultaneously form a gate electrode 3 and a common electrode 4.

Then, over the whole surface of the first transparent substrate 9 is formed a two-layered interlayer insulating film 10 consisting of $SiN_x$ and $SiO_2$. Then, on the substrate is formed an island-shaped semiconductor film 1 made of, for example, amorphous silicon (see FIG. 1) and the Cr material is patterned to form a data line 5, a pixel electrode 2, a source electrode 6 (see FIG. 1) and a drain electrode 7 (see FIG. 1) in the single step.

Finally, a passivation film 22 made of $SiN_x$ is formed over the whole surface of the top layer of the first transparent substrate 9 for protecting a back-channel to provide a TFT substrate 100.

There will be described a procedure for preparing a color-filter substrate 200 for coloring a transmitted light which is disposed opposing to the TFT substrate 100.

On the second transparent substrate 14 made of, for example, glass, is formed, by patterning, a black matrix 12 made of a resin in which a shielding material is dispersed. Then, a color layer 13 of R, G or B is formed. Then, a leveling layer 15 is formed over the whole surface of the second transparent substrate 14 and on the rear surface of the substrate are formed a conducting film 16 and a polarizing plate 17 to provide a color-filter substrate 200.

On each of the TFT substrate 100 and the color-filter substrate 200 is printed an alignment layer 11 by an appropriate process such as offset printing. By rubbing the alignment layers on the TFT substrate 100 and the color-filter substrate 200, the alignment-layer molecules are aligned to a given direction (a rubbing direction 19, see FIG. 1). Then, these substrates are put together with a certain gap by sandwiching a sandwiched cell-gap member and then a liquid crystal 20 is enclosed in the gap.

The feature of this embodiment is that in a liquid crystal as a base material, a dissociating substance and its salt are added in a molar ratio of 1:0.01 to 1:100. Specifically, phthalic anhydride and anhydrous potassium phthalate were added to 100 ppm as a dissociating substance and its salt, respectively. A specific resistance of the liquid crystal was reduced from $4.1 \times 10^{13}$ Ωcm to $1.4 \times 10^{11}$ Ωcm by the addition of phthalic anhydride and anhydrous potassium phthalate.

The other physical properties of the liquid crystal material were unchanged between before and after adding phthalic anhydride and anhydrous potassium phthalate.

The liquid crystal panel thus prepared was made in a normally black configuration by aligning the absorption axis of the polarizing plate 18 in the side of TFT substrate with the rubbing direction 19 of the TFT substrate 100 while placing the polarizing plate 17 in the side of the color-filter substrate so that the absorption axis of the polarizing plate 17 becomes orthogonal to that of the polarizing plate 18.

The term "normally black" as used herein refers to a configuration where the transmission axes of the polarizing plates placed on the outer surfaces of two substrates sandwiching the liquid crystal are orthogonal to each other and an initial alignment angle of the liquid crystal (rubbing direction) is aligned with a transmission axis of one of two polarizing plates. When using this configuration and a potential difference is zero to be applied between a pixel electrode a common electrode, that is, when the electric field to be applied to the liquid crystal is zero there is not a transmitting light to give a "black" state. Thus, such a panel configuration including the polarizing plates is referred to as "normally black".

This liquid crystal panel was placed under the conditions of 60° C. and relative humidity 85% for whole white display for 1000 hours. As a result, no problems such as alignment failure due to static electricity, spots or unevenness were observed.

The term "whole white display" has the following meaning. In a normally black configuration, when applying a voltage between a pixel electrode and a common electrode, a liquid crystal rotates to allow a light to transmit the liquid crystal. When applying an electric field in such a way that the liquid crystal rotates from its initial alignment angle by about 45°, a "white display" state is achieved. "White display" for all of the unit elements in the panel is referred to as "whole white display".

Embodiment 2 of this invention will be described.

A liquid crystal panel was prepared as described in Embodiment 1 except that to a liquid crystal were added benzamide and potassium benzamide to 100 ppm, respectively. The liquid crystal after adding the additives gave a specific resistance of $9.4 \times 10^{10}$ Ωcm.

The other physical properties of the liquid crystal material were unchanged between before and after adding benzamide and potassium benzamide.

This liquid crystal panel was placed under the conditions of 60° C. and relative humidity 85% for whole white display for 1000 hours. As a result, no problems such as alignment failure due to static electricity, spots or unevenness were observed.

Embodiment 3 of this invention will be described.

A liquid crystal panel was prepared as described in Embodiment 1 except that to a liquid crystal were added 1-naphthol and potassium 1-naphthol to 100 ppm, respectively. The liquid crystal after adding the additives gave a specific resistance of $7.4 \times 10^{10}$ Ωcm.

The other physical properties of the liquid crystal material were unchanged between before and after adding 1-naphthol and potassium 1-naphthol.

This liquid crystal panel was placed under the conditions of 60° C. and relative humidity 85% for whole white display for 1000 hours. As a result, no problems such as alignment failure due to static electricity, spots or unevenness were observed.

Embodiment 4 of this invention will be described.

A liquid crystal panel was prepared as described in Embodiment 1 except that to a liquid crystal were added phthalic anhydride and anhydrous potassium phthalate 1 ppm as a dissociating substance and its salt, respectively. The liquid crystal after adding the additives gave a specific resistance of $1.0 \times 10^{13}$ Ωcm.

The other physical properties of the liquid crystal material were unchanged between before and after adding phthalic anhydride and anhydrous potassium phthalate.

As the amount of a dissociating substance salt is lower than that of embodiment 1, the specific resistance of the liquid crystal after adding the additives becomes higher than that of Embodiment 1, but the dissociating substance and its salt are added being kept within a molar ratio of 1:0.01 to 1:100. Therefore, when this liquid crystal panel was placed under the conditions of 60° C. and relative humidity 85% for whole white display for 1000 hours, no problems such as alignment failure due to static electricity, spots or unevenness were observed.

In terms of Embodiments 1 to 3 selected from Embodiments 1 to 4, while a mixing ratio of a dissociating substance BH to its salt BC in a liquid crystal were varied, a panel was observed for display spots and unevenness. The results are shown in the table below where [BC] is a molar concentration of the dissociating substance and [BH] is a molar concentration of its salt.

A liquid crystal used in the description for Embodiment 1 to 4 may be specifically a cyano- or fluorine-containing liquid crystal represented by formula (11). It is, however, given only as a illustrative example and other liquid crystals may be used in Embodiments 1 to 4 of this invention.

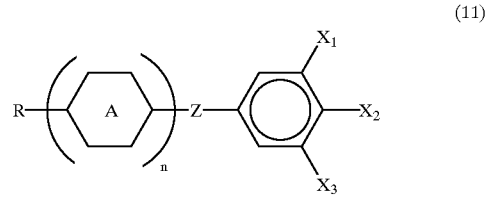

(11)

wherein $X_1$ to $X_3$ represent fluoro, cyano, trifluoromethyl, trifluoromethoxy, nitro or hydrogen; R is optionally substituted alkyl or alkoxy having 1 to 10 carbon atoms; the ring A represents a cyclohexane, benzene, dioxane, pyrimidine or [2,2,2]-bicyclooctane ring; Z is a single bond, an ester linkage, an ether linkage, methylene or ethylene; and n is an integer of 1 or 2. Specific examples include 2-(trans-4-propylcyclohexyl)-1-[trans-4-(3,4-dicyanopheny 1) cyclohexyl]ethane,
2,6-difluoro-1-cyano-4-[trans-4-(trans-4-propylcyclohexyl) cyclohexyl]benzene,
trans-4-heptyl-(3-fluoro-4-cyanophenyl) cyclohexane,
3-fluoro-4-cyanophenyl-trans-4-pentylcyclohexylcarboxylate,4-cyanophenyl-4-pentyl-[2,2,2]-bicyclooctane,
2-(trans-4-propylcyclohexyl)-1-[trans-4-(3-fluoro-4-nitro phenyl)cyclohexyl]ethane and
trans-4-heptyl-(3,5-difluoro-4-nitrophenyl)cyclohexane.

TABLE

| [BC]/[BH] | Display spots/Unevenness | | |
|---|---|---|---|
| | Embodiment 1 | Embodiment 2 | Embodiment 3 |
| 0.001 | X | X | X |
| 0.005 | Δ | X | X |
| 0.01 | ○ | ○ | ○ |
| 0.05 | ○ ~ ⊚ | ○ ~ ⊚ | ○ ~ ⊚ |
| 0.1 | ⊚ | ⊚ | ⊚ |
| 0.5 | ⊚ | ⊚ | ⊚ |
| 1 | ⊚ | ⊚ | ⊚ |
| 5 | ⊚ | ⊚ | ⊚ |
| 10 | ⊚ | ⊚ | ⊚ |
| 50 | ○ ~ ⊚ | ○ ~ ⊚ | ○ ~ ⊚ |
| 100 | ○ | ○ | ○ |
| 500 | Δ | X ~ Δ | X ~ Δ |
| 1000 | X | X | X |

Rating of display spots/Unevenness

X < X~Δ < Δ < ○ < ○~⊚ < ⊚

Bad ⟶ Good

The results indicate that a dissociating substance BH and its salt BC may be added with a mixing ratio of 0.01 to 100 to suppress alignment disorder without display spots or unevenness.

In particular, it is also shown that display spots and unevenness may be effectively prevented when a mixing ratio of a dissociating substance BH and its salt BC is 0.1 to 10.

There have been described Embodiments of this invention, but a specific resistance of a liquid crystal after adding additives is not limited in the values as described above. There were observed no problems such as alignment failure due to static electricity, spots and unevenness in the above whole while display tests as long as a specific resistance is within the range of $10^9$ Ωcm to $10^{13}$ Ωcm.

For the procedures in Embodiments of this invention described above, additives to a liquid crystal material other than those described in Embodiments may be used as long as they are added in a fashion of the mixture of an additive and its salt so that a hydrogen-ion concentration is kept constant.

For a liquid crystal material according to this invention, a dissociating substance and its salt may be added to the liquid crystal to keep the amount of ions included in the liquid crystal constant under temperature variation. Furthermore, the liquid crystal material of this invention may be used in a liquid crystal display of this invention to prevent alignment disorder due to static electricity and unevenness or spots due to excessive ion accumulation, leading to improved reliability.

What is claimed is:

1. A liquid crystal material, comprising:
   a liquid crystal comprising an additive, said additive including a dissociating substance and a conjugate salt thereof.

2. The liquid crystal material according to claim 1, wherein said dissociating substance has the structure represented by formula (1):

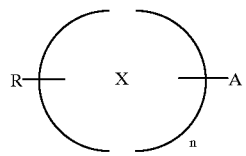

(1)

wherein R represents hydrogen, alkyl or alkoxy; X represents a cyclohexane or benzene ring; A represents phenyl substituted by at least one phthalic anhydride moiety, —COOH, —CONH, —NH$_2$ and/or —OH; and n represents an integer of 1 or 2; and said conjugate salt of said dissociating substance has the structure represented by formula (2):

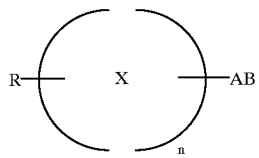

(2)

wherein R represents hydrogen, alkyl or alkoxy; X represents a cyclohexane or benzene ring; A represents phenyl substituted by at least one phthalic anhydride moiety, —COO—, —CON—, —NH— and/or —O—; n represents an integer of 1 or 2; and B represents sodium or potassium.

3. A liquid crystal material, comprising:
   a liquid crystal comprising an additive, said additive including a dissociating substance and a conjugate salt thereof,
   wherein said dissociating substance and its conjugate salt are added to the liquid crystal in such a way that when the amount of said dissociating substance added to said liquid crystal is 1.0, said conjugate salt of said dissociating substance is added in a molar-concentration ratio of 0.01 to 100.

4. A liquid crystal material, comprising:
   a liquid crystal comprising an additive, said additive including a dissociating substance and a conjugate salt thereof,
   wherein said dissociating substance and its conjugate salt are added to said liquid crystal in such a way that when the amount of said dissociating substance added to said liquid crystal is 1.0, said conjugate salt of said dissociating substance is added in a molar-concentration ratio of 0.1 to 10.

5. A liquid crystal material, comprising:
   a liquid crystal comprising an additive, said additive including a dissociating substance and a conjugate salt thereof,
   wherein a specific resistance of said liquid crystal is $10^9$ Ωcm to $10^{13}$ Ωcm.

6. A liquid crystal display comprising:
   said liquid crystal material as set forth in claim 1;
   and a pair of substrates sandwiching said liquid crystal material and controlling an orientation of said liquid crystal material by a lateral electric field generated on one of said substrates.

7. The liquid crystal display according to claim 6, wherein said dissociating substance has the structure represented by formula (1):

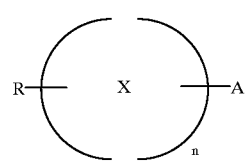

(1)

wherein R represents hydrogen, alkyl or alkoxy; X represents a cyclohexane or benzene ring; A represents phenyl substituted by at least one phthalic anhydride moiety, —COOH, —CONH, —NH$_2$ and/or —OH; and n represents an integer of 1 or 2; and said conjugate salt of said dissociating substance has the structure represented by formula (2):

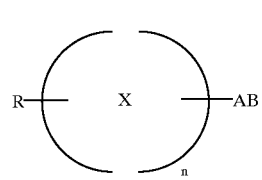

(2)

wherein R represents hydrogen, alkyl or alkoxy; X represents a cyclohexane or benzene ring; A represents phenyl substituted by at least one phthalic anhydride moiety, —COO—, —CON—, —NH— and/or —O—; n represents an integer of 1 or 2; and B represents sodium or potassium.

8. A liquid crystal display, comprising:
   said liquid crystal material as set forth in claim 3; and
   a pair of substrates sandwiching said liquid crystal material and controlling an orientation of said liquid crystal material by a lateral electric field generated on one of said substrates.

9. A liquid crystal display, comprising:

said liquid crystal material as set forth in claim 4; and a pair of substrates sandwiching said liquid crystal material and controlling an orientation of said liquid crystal material by a lateral electric field generated on one of said substrates.

10. A liquid crystal display, comprising:

said liquid crystal material as set forth in claim 5; and a pair of substrates sandwiching said liquid crystal material and controlling an orientation of said liquid crystal material by a lateral electric field generated on one of said substrates.

11. The liquid crystal display according to claim 6, wherein one of said substrates comprises a thin film transistor while the other comprises a color layer.

12. The liquid crystal display according to claim 6, wherein said substrates comprises an alignment layer on the top layers in their opposing surfaces.

13. The liquid crystal material of claim 1, wherein a hydronium ion concentration of said liquid crystal material is substantially independent of temperature.

14. The liquid crystal material of claim 1, wherein said conjugate salt completely dissociates.

15. The liquid crystal material of claim 1, wherein said dissociating substance comprises phthalic anhydride and said conjugate salt comprises anhydrous potassium phthalate.

16. The liquid crystal material of claim 1, wherein said dissociating substance and said conjugate salt thereof affect a specific resistance of said liquid crystal without affecting other physical properties of said liquid crystal.

17. The liquid crystal material of claim 1, wherein said dissociating substance comprises benzamide and said conjugate salt comprises potassium benzamide.

18. The liquid crystal material of claim 1, wherein said liquid crystal comprises one of a cyano group and a fluorine group.

19. The liquid crystal material of claim 1, wherein an amount of said dissociating substance and said conjugate salt in said liquid crystal comprises 100 ppm.

20. A liquid crystal display, comprising:

a pair of substrates; and a liquid crystal material according to claim 1, disposed between said pair of substrates.

* * * * *